Dec. 27, 1966  R. G. GILLILAND  3,293,741
BRAZING ALLOYS FOR REFRACTORY METALS
Filed April 20, 1964
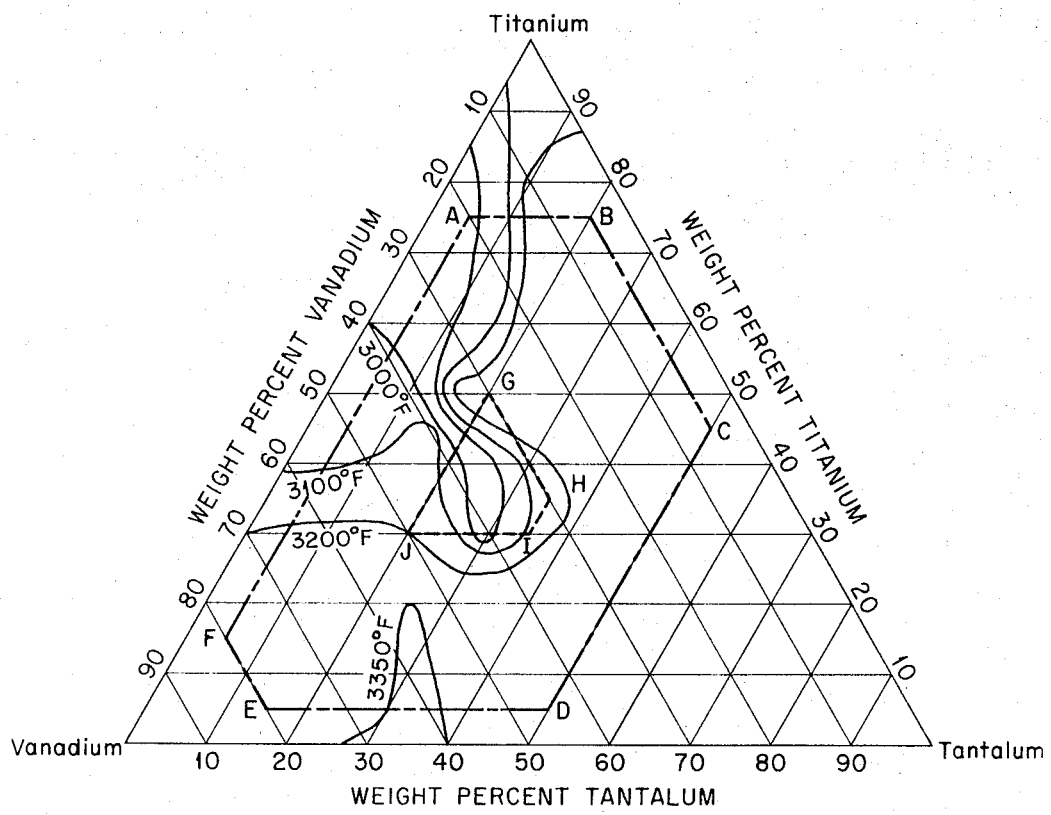
INVENTOR.
Ralph G. Gilliland
BY
ATTORNEY.

United States Patent Office 3,293,741
Patented Dec. 27, 1966

3,293,741
BRAZING ALLOYS FOR REFRACTORY METALS
Ralph G. Gilliland, Oak Ridge, Tenn., assignor to the United States of America as represented by the United States Atomic Energy Commission
Filed Apr. 20, 1964, Ser. No. 361,635
3 Claims. (Cl. 29—494)

This invention relates to brazing alloys for refractory metals and more particularly to brazing alloys for joining tantalum, niobium, tungsten, molybdenum, and their alloys.

The refractory metals tantalum, niobium, tungsten, molybdenum and alloys thereof are useful for numerous high-temperature applications in the nuclear energy and space fields. The properties of these metals are favorable for their use in high-temperature nuclear reactor fuel elements, in piping and heat exchangers, in re-entry vehicles and in other hardware for space systems.

One of the deterrents to wider use of these metals has been the lack of adequate fabrication methods, particularly in the field of joining. Joining of complex assemblies is most easily accomplished by brazing, and for locations of limited access brazing is often the only way to obtain high-integrity joints. Suitable brazing alloys are available for joining these metals for service at lower temperatures, but not for elevated temperatures such as 1700° to 2500° F. For service at these temperatures, brazing alloys having melting points of about 3000° F. to 3400° F. are desired.

In addition to the required temperature capability, other features desired in brazing alloys for these metals are good room- and elevated-temperature mechanical properties, compatibility with the base metal and resistance to the intended service atmosphere. Flowability and wettability are also required for effective brazing.

It is therefore an object of my invention to provide a method of joining refractory metals.

Another object is to provide an alloy system for brazing tantalum, niobium, tungsten, molybdenum and alloys thereof.

Another object is to provide brazing alloys for joining said metals for service at temperatures from 1700° to 2500° F.

Another object is to provide brazing alloys with melting points in the range of about 3000° F. to 3400° F.

Other objects and advantages of my invention will be apparent from the following description and claims.

In accordance with my invention tantalum, niobium, tungsten, molybdenum and alloys containing a predominant proportion thereof are joined by brazing with an alloy of the composition 5 to 80 weight percent vanadium, 5 to 50 weight percent tantalum and 5 to 75 weight percent titanium. Alloys of this composition exhibit the desired temperature capability, compatibility with the base metals and favorable mechanical properties.

The brazing alloy compositions within the scope of my invention are depicted graphically as the area bounded by ABCDEF in the accompanying figure, which is a ternary diagram of the tantalum-vanadium-titanium system. Lines of constant brazing temperature are depicted by the curved lines in the diagram. Compositions for a given brazing temperature may be selected by reference to these lines.

A composition within the area bounded by ABCDEF is critical to the required combination of properties in the brazing alloy, namely, alloy stability necessary to minimize reaction with the base metal, flowability and wettability, and ductility in the as-cast and as-brazed states. Compositions outside this area fail to meet one or more of these requirements or they tend to volatilize under brazing conditions of high temperature and high vacuum.

Alloys of the composition 30 to 50 weight percent vanadium, 30 to 50 weight percent titanium and 20 to 30 weight percent tantalum, as depicted by the area bounded by GHIJ in the figure, are preferred for the most advantageous combination of these properties.

The brazing alloys described above exhibit excellent room-temperature ductility, and they may be fabricated into usable form such as thin sheet or foil by cold-rolling from the arc-melted condition.

Brazing with these alloys may be effected by conventional techniques. The parts to be joined are positioned in abutting relationship with the brazing alloy disposed at the joint. The assembly is then heated to brazing temperature under non-oxidizing conditions. An atmosphere of an inert gas such as argon or a vacuum may be employed. Complete flow of the brazing alloy is normally obtained by holding at temperature for a period of about 5 minutes. Thicker or larger parts may require a longer heating period. The assembly is then cooled in the absence of oxygen or other contaminants.

The brazing alloy compositions and method described above are applicable to joining tungsten, tantalum, niobium, molybdenum and alloys containing a predominant proportion, that is, over 50 weight percent of these metals to themselves and to one another.

My invention is further illustrated by the following examples.

EXAMPLE I

Brazing alloys of varying composition in the vanadium-tantalum-titanium system were prepared by combining and arc-melting weighed amounts of the alloy components. The resulting alloy button was cold-rolled to produce a sheet 0.020 inch thick. Small sections of the alloys were placed on tantalum, tungsten, niobium, and niobium-1 weight percent zirconium sheets and the specimens were heated to brazing temperature in vacuum. Brazing temperatures for the alloy compositions are given in the following table.

Table.—Brazing temperatures for alloy compositions

| Composition (weight percent) | Brazing temperature (° F.) |
|---|---|
| 65V-30Ta-5Ti | 3350 |
| 55V-25Ta-20Ti | 3350 |
| 50V-20Ta-30Ti | 3200 |
| 45V-20Ta-35Ti | 3100 |
| 40V-10Ta-50Ti | 3175 |
| 40V-20Ta-40Ti | 3100 |
| 35V-5Ta-60Ti | 3200 |
| 30V-15Ta-55Ti | 3100 |
| 20V-5Ta-75Ti | 3000 |

In each case the brazing alloy wetted the refractory base metal without producing any significant reaction with the base metal.

EXAMPLE II

The as-brazed mechanical strength and ductility of brazing alloys in the vanadium-titanium-tantalum system were tested by brazing "T" section specimens and bending the specimens. Eight alloys of varying composition within the limits specified by the area ABCDEF in the figure were processed into sheet by the procedure of Example I. Sections of the sheet were placed on one end of two-inch-long strips of tantalum, tungsten, niobium and niobium-1 weight percent zirconium arranged in an inverted T configuration. The T joint assemblies were placed in vacuum and heated to brazing temperature. In each case the brazing alloy wet and flowed the entire length of the T joint, producing a sound joint without reaction with the base metal. The resulting joints were tested at room temperature by flattening the vertical member and thereafter bending the specimen 180 degrees. The specimen and brazed joint remained intact, with only minor cracking of the brazing alloy, thus indicating excellent as-brazed ductility.

The above examples are merely illustrative and are not to be understood as limiting the scope of my invention which is limited only as indicated by the appended claims.

Having thus described my invention, I claim:

1. A brazing alloy for joining tungsten, tantalum, niobium, molybdenum and alloys containing a predominant proportion of said metals to themselves and to one another, said brazing alloy consisting of 30 to 50 weight percent vanadium, 30 to 50 weight percent titanium and 20 to 30 weight percent tantalum.

2. The method of joining tungsten, tantalum, niobium, molybdenum and alloys containing a predominant proportion of said metals to themselves and to one another which comprises disposing surfaces of the parts to be joined in abutting relationship with a brazing alloy disposed adjacent said abutting surface, said brazing alloy consisting of 5 to 80 weight percent vanadium, 5 to 50 weight percent tantalum, 5 to 75 weight percent titanium, heating the resulting assembly to brazing temperature in the range of about 3000° F. to 3400° F. under non-oxidizing conditions and cooling the resulting brazed joint.

3. The method of claim 2 wherein the brazing alloy consists of 30 to 50 weight percent vanadium, 30 to 50 weight percent titanium, and 20 to 30 weight percent tantalum.

References Cited by the Examiner

UNITED STATES PATENTS

| | | | |
|---|---|---|---|
| 2,950,189 | 8/1960 | Ames | 75—175.5 X |
| 3,038,249 | 6/1962 | Gilliland et al. | 75—175.5 X |
| 3,111,406 | 11/1963 | Kaarlela | 75—175.5 |
| 3,128,178 | 4/1964 | Duffek | 75—175.5 X |
| 3,131,059 | 4/1964 | Kaarlela | 75—175.5 X |
| 3,161,503 | 12/1964 | Lenning et al. | 75—175.5 X |
| 3,220,828 | 11/1965 | Kaarlela | 75—175.5 X |

DAVID L. RECK, *Primary Examiner.*

C. N. LOVELL, *Assistant Examiner.*